Feb. 5, 1952     W. F. RICHARDS     2,584,615
THERMOCOUPLE DEVICE
Filed March 18, 1949
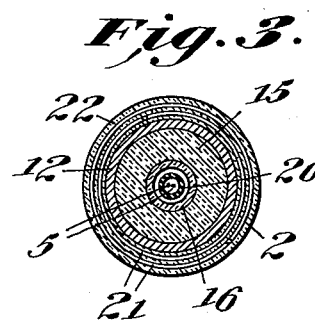
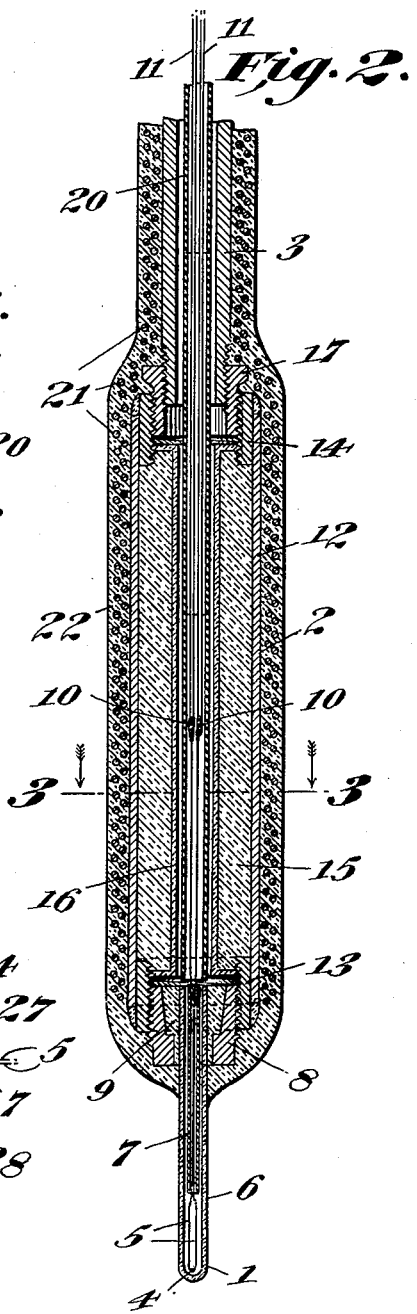
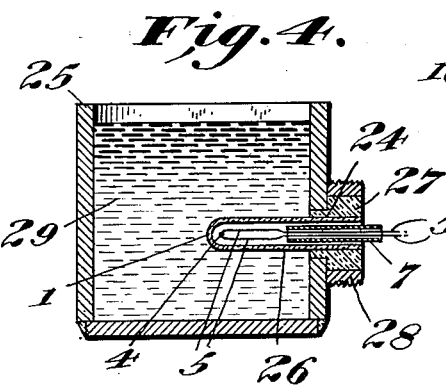
Inventor
Ward F. Richards.
By R. S. C. Dougherty
Attorney

UNITED STATES PATENT OFFICE 2,584,615

THERMOCOUPLE DEVICE

Ward F. Richards, Bethlehem, Pa., assignor to Bethlehem Steel Company, a corporation of Pennsylvania Application March 18, 1949, Serial No. 82,039

1 Claim. (Cl. 136—4)

My invention relates in general to a pyrometric thermocouple device, and more particularly to such a device for ascertaining the temperatures of molten metal baths.

It is generally recognized that the most accurate type of device available for measuring the temperature of liquid steel baths in open hearth and electric arc furnaces is, when properly used, the immersion thermocouple. This type of device depends for its operation upon the very small electric current generated by the application of heat to the hot junction between wires of dissimilar metals or alloys. The thermocouple wires best able to resist high temperatures, preferably platinum and a platinum-rhodium or platinum-iridium alloy, are quite expensive, and therefore should be short. The greater the temperature differential between the hot junction and the cold junction forming the terminals of these thermo-elements, however, the greater will be the amount of electrical energy generated.

One object of my invention, therefore, is to provide a high temperature thermocouple device which is adapted for taking either direct or indirect temperature measurements of molten metals.

Another object is to provide a high temperature thermocouple device utilizing short lengths of thermo-element wires and having ample inner protection in the cold junction housing assembly to maintain a relatively low and substantially constant temperature therein during the temperature measurement period.

Another object is to provide a high temperature thermocouple device which has no carbon or graphite parts to set up a destructive reducing action on the thermo-element wires.

A further object is to provide a high temperature thermocouple device which is relatively inexpensive and simple in construction, easy to maintain and with a minimum of parts to be replaced.

Still other objects, purposes and advantages of my invention will appear hereinafter in the specification and in the appended claim.

In order to have my invention more distinctly understood, I shall now refer to the sheet of drawings hereto annexed, in which like characters of reference designate like parts:

Figure 1 is a side elevation of my invention arranged for use as a direct immersion thermocouple device;

Fig. 2 is a vertical section of the device;

Fig. 3 is a horizontal section on the line 3—3 of Fig. 2; and

Fig. 4 is a vertical section of the cup attachment for indirectly measuring bath temperatures.

Referring now to Figs. 1 to 3 inclusive of the drawings, the device, when used for direct measurements of bath temperatures, comprises three readily separable elements, namely, the immersion tip 1, the cold junction housing 2, and the long manipulating pipe 3.

The immersion tip 1 includes the welded hot junction 4 of the short 6-inch to 7-inch thermoelement wires 5 of a platinum/platinum 10% rhodium thermocouple, which is protected by a terminally closed thin-walled quartz or satin finish silica tube 6 and provided with an inner insulating tube 7 which centers and supports the upper portion of thermo-element wires 5. The inner end of the tube 6 is secured in the externally threaded tube retainer bushing 8 by a suitable air-setting refractory cement 9, for example "Sairset" cement, which is composed of clay diaspore with sodium silicate as a binder.

The brazed cold junctions 10 between the thermo-element wires 5 and the compensating lead wires 11 are enclosed within the protective housing 2, which comprises a suitable length of steel pipe 12 having short interiorly threaded pipe sleeves 13 and 14 welded inside each end, and an inner lining 15 of a refractory cement such as "Sairset" provided with a smooth inner surface coating 16 of porcelain cement.

Into the upper pipe sleeve 14 is threaded a reducer bushing 17, into which in turn is threaded one end of the long manipulating pipe 3. The other end of said pipe 3 is provided with a ring handle 18 whereon is mounted a polarity receptacle 19, which is connected to the compensating lead wires 11 extending through the insulator 20 in the pipe 3.

The housing 2 and manipulating pipe 3 are then bound around with wire 21 and covered with a coating 22 of "Sairset" cement or the like heat-resistive material, for added protection against slag attack, excessively deep immersion or hot metal splash.

Whenever a bath temperature is to be taken, the plug 23 inserted in receptacle 19 connects the device through an extension lead wire (not shown) to a fast reading millivoltmeter (also not shown) properly calibrated as a pyrometer of the desired scale. Using, for example, a standard Leeds and Northrup electronic pyrometer, approximately twenty seconds' immersion in the liquid bath is all that is required to record a temperature.

For temperatures above those which the thermo-elements will stand without melting the cup attachment shown in Fig. 4 may be used to measure the temperature of a cupful of the molten metal withdrawn from the bath. Horizontally projecting through an orifice 24 into the metal cup 25 is the quartz tube 26 tightly secured by "Sairset" or similar cement 27 centrally of the nipple 28 welded to the outside of the cup 25. This device is substituted for the immersion tip 1 simply by chipping away or otherwise removing sufficient of the refractory cement coating 22 around the bushing 8 to permit unscrewing the bushing 8 from the sleeve 13 to remove the quartz tube 6, and then screwing the nipple 28 into the sleeve 13, with the hot junction 4 and the insulator 7 being now in the quartz tube 26.

When the cup 25 is filled with molten steel 29, the steel begins to cool while the thermocouple begins to heat up. Therefore, this is a relative or indirect measurement of the bath temperature, rather than an absolute value, since what is registered is the point where the cooling curve of the molten steel and the heating curve of the thermocouple coincide.

The device is sufficiently light in weight to be handled with ease by one man. The short length of the thermo-elements renders it inexpensive to construct. While the cold junctions are therefore close to the hot end of the assembly, and their housing may in fact be immersed under the surface of the bath, the housing is so well insulated against heat that there is virtually no temperature rise at the cold junctions during a normal bath temperature measurement. Although the temperature at the cold junctions may rise to about 400° F. after the thermocouple has been removed from the furnace and the retained heat of the refractory coated pipe soaks through to the junction, after the assembly has cooled again to room temperature and has been inspected and if necessary a new silica tube has been installed, it is then ready for another immersion.

Although I have described my invention hereinabove in considerable detail, I do not wish to be limited strictly to the exact and specific details disclosed, but I may also use such modifications, substitutions or equivalents thereof as are included within the scope and spirit of the invention, or pointed out in the appended claim.

I claim:

A device for measuring temperatures of molten metal by direct immersion therein comprising a thermocouple having short thermo-elements connected by cold junctions to lead wires, a long tubular handle protecting the lead wires, a cold junction housing secured to said handle, said cold junction housing comprising a length of steel pipe having an inner lining of refractory cement and a smooth inner surface coating of porcelain cement, and a layer of material resistant to heat and slag attack applied externally to the housing and to the exposed length of the handle.

WARD F. RICHARDS.

REFERENCES CITED

The following references are of record in the file of this patent:

UNITED STATES PATENTS

| Number | Name | Date |
| --- | --- | --- |
| 1,367,026 | Drinker | Feb. 1, 1921 |
| 1,893,748 | Klopsteg | Jan. 10, 1933 |
| 2,019,695 | Ross | Nov. 5, 1935 |
| 2,054,120 | De Florez | Sept. 15, 1936 |
| 2,463,427 | Richards | Mar. 1, 1949 |

OTHER REFERENCES

Weitzenkorn, Electric Furnace Steel, Proc. 2nd. Conf. A. S. M. E. (1944), pages 146, 147.

Wheelco Educational Bulletin No. 8 (1948), pages 2 and 3.